Feb. 27, 1968   W. W. BARTLETT ET AL   3,370,462
WATER CURRENT METER
Filed Dec. 7, 1965
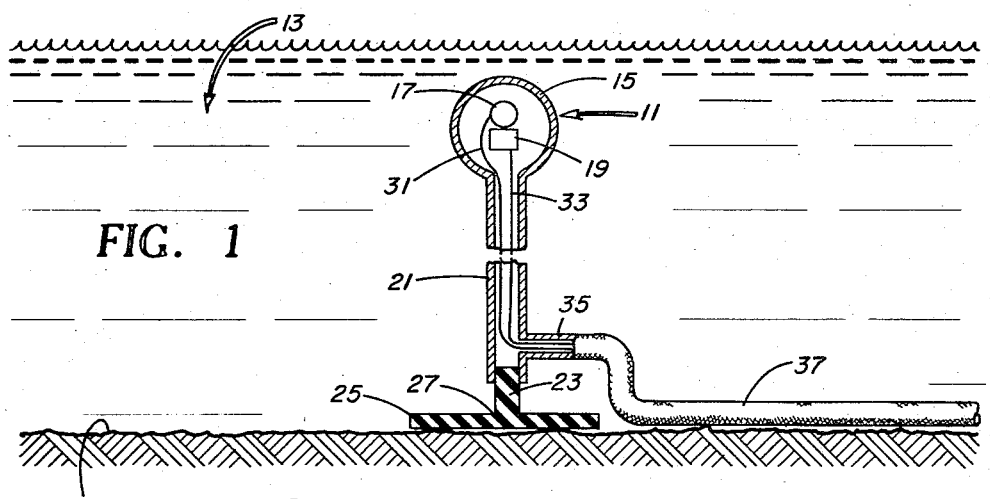
FIG. 1
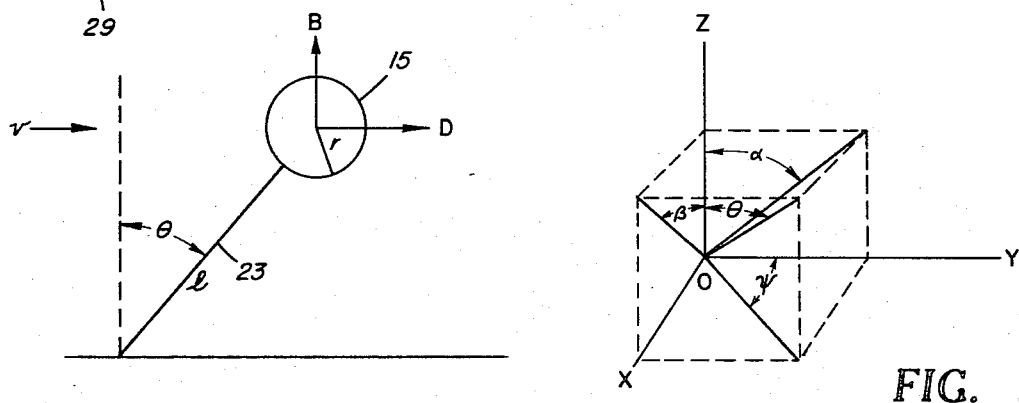
FIG. 2
FIG. 3
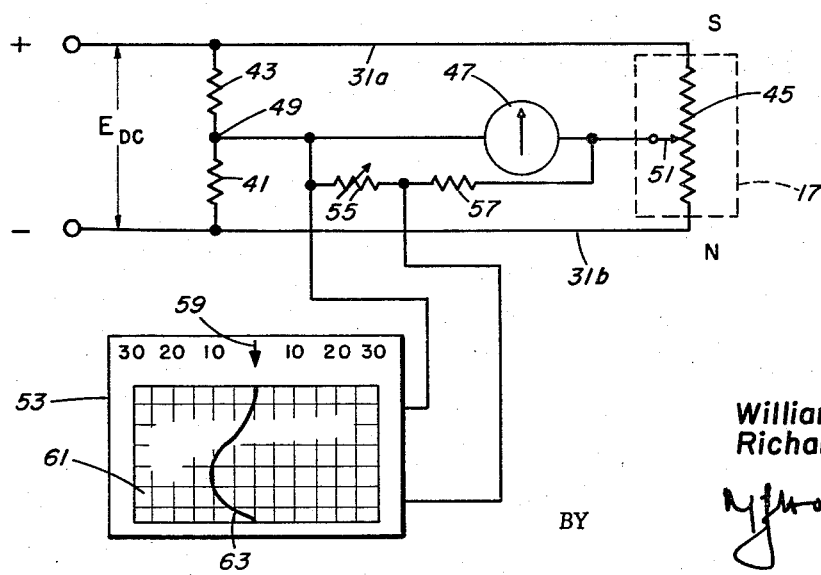
FIG. 4
INVENTOR
William W. Bartlett
Richard M. Dunlap
BY
ATTORNEY 3,370,462
Patented Feb. 27, 1968

3,370,462
WATER CURRENT METER
William W. Bartlett, Portsmouth, and Richard M. Dunlap, Middletown, R.I., assignors to the United States of America as represented by the Secretary of the Navy
Filed Dec. 7, 1965, Ser. No. 512,247
9 Claims. (Cl. 73—189)

ABSTRACT OF THE DISCLOSURE

A pair of mutually perpendicular angle sensors are disposed within a sealed hollow sphere. The sphere is connected to a flexible rubber cord by way of a rigid hollow stem and the combination then inserted and anchored in a body of water. The amount of displacement of the angle sensors measured by a cable connected remote recorder allows for a direct measurement of the water velocity in a body of water.

---

The invention described herein may be manufactured and used by or for the Government of the United States of America for governmental purposes without the payment of any royalties thereon or therefor.

This invention relates to apparatus for measuring the velocity of water current and more particularly to a bottom mounted device for continuous measurement of water currents.

One of the devices used in the past for measuring water currents is an impeller device which rotates when immersed in flowing water. The rate of rotation is related to the rate of water flow. This device suffers the disadvantages of being difficult to calibrate and having an impeller which is subject to fouling if it is immersed for extended periods of time. A second type of water current meter which has been used in the past is the electromagnetic flow meter in which an electric field is induced in a medium moving relative to the magnetic field. Such a device, in addition to the problem of calibration, has exposed electrodes which are subject to polarization if immersed for extended periods of time, particularly in the ocean or other bodies of salt water.

In the apparatus of this invention, a pair of mutually perpendicular angle sensors are disposed within the sealed hollow sphere. Electrical conductors are led through a cylindrical tubing and out through a watertight packing gland to a remote recording station by means of a submarine cable. The angle sensors used in this invention are pendulum type rheostats or variable resistance devices. The rheostats are made part of a Wheatstone bridge circuit which is arranged such that a change in resistance will produce a voltage change. Indicating means such as a voltmeter or recorder or both are connected to the bridge circuit and located at a convenient remote observation point or station.

An object of this invention is to provide instantaneous data of the velocity and direction of water currents at the point of installation of a water current sensor.

It is another object of this invention to provide water current data for long periods of time without disturbing the water current sensor.

It is another object of this invention to provide a water current meter which provides remote indications.

It is yet another object of this invention to provide a water current sensor with a remote indicating means to display information sensed by the water sensor at a remote observation point.

A yet further object of this invention is to provide a water current meter mounted on the bed of a body of water which provides a remote indication of the direction and velocity of the water current.

Other objects and many of the attendant advantages of this invention will be greatly appreciated as the same becomes better understood by reference to the following detailed description when considered in connection with the accompanying drawings wherein:

FIG. 1 of the drawings illustrates the water current assembly of the instant invention;

FIG. 2 of the drawings is a diagram illustrating the forces acting upon the sphere and the resultant angular displacement;

FIG. 3 of the drawings illustrates the geometric relationship of the component angles; and FIG. 4 illustrates the bridge circuit for the indicator of the instant invention.

Referring now to FIG. 1 of the drawings, a water current meter 11 is shown in a body of water 13. A hollow buoyant spherical member 15 is provided for housing angle sensing pendulum rheostats 17 and 19 therewithin. A metal stem or tubing 21 is connected to the sphere 15 to a flexible rubber cord 23 which in turn is connected to a base 25 at point 27. Base 25 is mounted on bed or bottom 29 of the body of water 13. Electrical cables 31 and 33, which are connected to angle sensors 17 and 19 respectively, are brought through the metal stem or tubing 21. The cables 31 and 33 are brought out through stem 21 at a watertight connection or packing gland 35 at which point cables 31 and 33 are fed into watertight submarine cable 37. Cable 37 runs along the bed of the body of water to the shore line or other remote point where the indicating and recording equipment is located.

Referring now to FIG. 2 of the drawings in which a diagram of the displacement and the forces acting upon the sphere is shown having a sphere 15 shown connected to a stem 23 having a length $l$ and being displaced from the vertical by an angle $\theta$. The velocity of water current is represented by $v$. The sphere 15 is shown as having a radius $r$ and having forces B and D acting thereon at right angles. Force B represents the upward force acting on the sphere as a result of the buoyancy of the hollow sphere in the fluid medium such as water. The horizontal force D represents the horizontal force acting upon the sphere 15 caused by the water current. Considering now the moment relationships, a first moment equation $D \times (l+r) \cos \theta = B \times (l+r) \sin \theta$ or, $\tan \theta = D/B$. In general, $D = k \times v^2$ where $k$ is a constant relating to the drag on the subject or sphere. Therefore, substituting, $v^2 = B/K \tan \theta$.

Referring now to FIG. 3 of the drawings, angular displacements are shown in the X, Y and Z axes, and the geometrical relationships between the component angles and the actual displacement angle are shown. In the geometric configuration of FIG. 3 of the drawings, an angle $\alpha$ is shown which is the projection of angle $\theta$ on the YOZ plane. Similarly, angle $\beta$ is a projection of angle $\theta$ on the XOZ plane and angle $\psi$ in the projection of angle $\theta$ on the XOY plane in the geometric figure shown in FIG. 3 of the drawings. The angular relationships may be given as follows; $\tan^2 \theta = \tan^2 \alpha + \tan^2 \beta$; and $$\tan \psi = \frac{\tan \beta}{\tan \alpha}$$

Referring now to FIG. 4 of the drawings, in which the electrical bridge circuit is shown, a Wheatstone bridge arrangement is provided in which the pendulum rheostat 17 is connected as part of the bridge circuit which includes resistors 41 and 43. Conductors 31a and 31b are shown connecting the resistance element 45 of the pendulum rheostat 17 to resistors 41 and 43 and to a source of D-C voltage $E_{dc}$. Conductors 31a and 31b may be the conductors of cable 31 which is contained within the submarine cable 37 as shown in FIG. 1. The bridge is completed by the connection of meter 47 between juncture 49 and the moveable tap 51 of the pendulum rheostat 17. A recording voltmeter or indicator 53 may be connected to receive a desired proportion of the output voltage which appears across voltmeter 47 by the connection of the terminals of meter 53 across the variable resistor 55 of the series connected resistors 55 and 57. Variable resistor 55 may be adjusted so that a desired scale deflection of pointer or indicator 59 is obtained. Graph 61 shows a line 63 which represents a continuous voltage reading recorded on the graph. The graph 61 may move at a constant rate with respect to time. Recorder 53 may be any of a number of standard ink recording meters.

"S" and "N" on the ends of the rheostat indicate the south and north direction respectively with the assumption that pendulum rheostat 17 is oriented for movement in the north-south direction. A movement of tap 51 along the resistance wire 45 of pendulum 17 either south or north from the central position shown will cause an upset in the balance of the bridge and a voltage output will appear across meter 47. A portion of this voltage will be applied to recording indicator 53.

Referring now to FIGS. 1 through 4 of the drawings, when the water current of the body of water 13 acts upon the sphere 15 with the velocity $v$, then the sphere 15 will be moved or displaced from the vertical by an angle $\theta$. This displacement angle $\theta$ may be resolved into two mutually perpendicular displacement angles $\alpha$ and $\beta$. It is assumed here that the displacement angle $\alpha$ will be indicated by the movement of the variable tap of pendulum rheostat 17 oriented in a north-south direction, for example. An angle $\beta$ will be sensed by the movement of the center tap of pendulum resistor 19 which is oriented in an east-west direction for example.

If desired, the outputs of the bridge circuits of the pendulum rheostats 17 and 19 may be connected to the $x$ and $y$ inputs respectively of an $x$-$y$ plotter. By using the graph paper having polar coordinates, for example, the angular direction of the water current as well as the velocity may be read directly. For example, if the output from the north-south pendulum rheostat is applied to the $y$ axis as input and the output of the east west pendulum rheostat is applied to the $x$ axis input of an $x$-$y$ plotter, then the displacement of the indicator from the central zero position will be the vector sum of the two angular displacements on the $x$ and the $y$ axes. The location of the indicator as a result of the two voltages applied to the $x$-$y$ plotter the indicator will be on position at which a radial line drawn through the position from the central zero position will indicate the direction of the water current and a distance from the center will be an indication of the velocity of the water current. With proper adjustments of the voltage input and the proper scale factors on the chart the direction of the water current in the velocity may be read directly.

Obviously many modifications of the present invention are possible in the light of the above teachings. It is therefore to be understood that within the scope of the appended claims the invention may be practiced otherwise than as specifically described.

What is claimed as new and desired to be secured by Letters Patent of the United States is:

1. A water current meter for determining the velocity and direction of water flow in a body of water comprising:
   a buoyant spherical enclosure housing a first angle sensing means and a second angle sensing means, said first angle sensing means and said second angle sensing means being pendulum type rheostats, said first angle sensing means being positioned to detect component angular displacement of said sphere in a first vertical plane, said second angle sensing means being positioned to detect component angular displacement of said sphere in a second vertical plane, said second vertical plane being perpendicular to said first vertical plane,
   stem means flexibly connecting said enclosure to a bed of a body of water, said stem means comprises an upper rigid hollow metal portion and a lower solid flexible portion, said upper portion being connected to said enclosure and said lower portion being connected to a base member mounted on the bed of said body of water,
   first indicator means located at a remote point,
   second indicator means located at said remote point,
   first connecting means connecting said first angle sensing means to said first indicator,
   second connecting means connecting said second angle sensing means to said second indicator, said first and second connecting means being cable housed within a watertight submarine cable.

2. A water current meter for indicating the speed and direction of the water current of a body of water comprising,
   a buoyant spherical enclosure, said enclosure housing a first angle sensing pendulum rheostat oriented to indicate angular displacement in a first vertical plane, a second angle sensing pendulum rheostat oriented to indicate angular displacement in a second vertical plane, said second vertical plane being perpendicular to said first vertical plane,
   base means mounted on the bed of said body of water,
   a hollow stem means fixedly connected at one end to said spherical enclosure, the other end of said stem means being connected by a flexible cord to said base such that said stem is free to have angular movement in any vertical plane,
   means connecting said first rheostat to a first Wheatstone bridge,
   means connecting said second rheostat to a second Wheatstone bridge,
   a first meter connected to said first Wheatstone bridge for indicating the angular position of said first rheostat,
   a second meter connected to said second Wheatstone bridge for indicating the angular position of said second rheostat.

3. A water current meter for indicating the velocity and direction of water current in a body of water comprising,
   a buoyant housing,
   a first pendulum rheostat within said housing oriented to sense an angular movement in a first vertical plane,
   a second pendulum rheostate within said housing oriented to sense an angular movement in a second vertical plane perpendicular to said first vertical plane,
   a base member mounted on the bed of said body of water,
   a hollow rigid stem connected at the top portion thereof to said housing, the bottom portion of said stem being connected to one end of a flexible cord, the other end of said flexible cord being fastened to said base member,
   a remotely located indicating station,
   a first Wheatstone bridge arrangement located at said station,
   a second Wheatstone bridge arrangement at said station,
   a first cable means connecting said first rheostat to said first Wheatstone bridge arrangement,
   a second cable means connecting said second rheostat to said second Wheatstone bridge arrangement,
   a first indicating means connected to said first Wheatstone bridge arrangement,
   a second indicating meter means connected to a second Wheatstone bridge arrangement, said first and said second cables housed within a submarine cable, and water tight connecting means between said stem and said submarine cable.

4. A water current meter as in claim 3 wherein an x-y plotter is connected across the first and second meter means respectively.

5. A water current meter as in claim 3 wherein said first and second meter means are recording voltmeters.

6. A water current meter comprising:

means for providing a watertight enclosure in a body of water, flexible means fixedly located in said body of water, rigid means connecting said enclosure to said flexible means, first angle sensor means mounted within said enclosure to sense the angular deviation of said enclosure in response to water current from vertical to a first vertical plane, second angle sensor means mounted within said enclosure to sense the angular deviation of said enclosure in response to water current from vertical in a vertical plane perpendicular to said first vertical plane, and means remotely connected to said first and second angle sensor means for indicating the velocity of the water current in response to the sensing of the angular deviation of said enclosure by said first and second angle sensor means.

7. A water current meter as in claim 6 wherein said rigid means is a cylindrical hollow member.

8. A water current meter as in claim 7 wherein said first and second angle sensor means are pendulum type rheostats.

9. A water current meter as in claim 8 wherein said means for providing a watertight enclosure is a buoyant spherical member.

References Cited

UNITED STATES PATENTS

| | | | |
|---|---|---|---|
| 2,462,577 | 2/1949 | Warren | 73—189 |
| 3,113,283 | 12/1963 | Fliegler et al. | 338—46 |
| 3,203,236 | 8/1965 | Prince | 73—170 |
| 3,217,536 | 11/1965 | Matsinger et al. | 73—189 |
| 3,264,869 | 8/1966 | Erdely | 73—189 |

RICHARD C. QUEISSER, *Primary Examiner.*

JAMES GILL, *Examiner.*

JERRY W. MYRACLE, *Assistant Examiner.*